(12) United States Patent
Eriksson

(10) Patent No.: US 10,209,118 B2
(45) Date of Patent: Feb. 19, 2019

(54) RADAR LEVEL GAUGE SYSTEM AND METHOD WITH SIGNAL PROPAGATION PATH MODELING

(71) Applicant: Rosemount Tank Radar AB, Gothenburg (SE)

(72) Inventor: Mikael Eriksson, Vastervik (SE)

(73) Assignee: ROSEMOUNT TANK RADAR AB, Gothenburg (SE)

( * ) Notice: Subject to any disclaimer, the term of this patent is extended or adjusted under 35 U.S.C. 154(b) by 445 days.

(21) Appl. No.: 15/002,473

(22) Filed: Jan. 21, 2016

(65) Prior Publication Data

US 2017/0211962 A1 Jul. 27, 2017

(51) Int. Cl.
  *G01S 7/41* (2006.01)
  *G01S 13/88* (2006.01)
  *G01F 23/284* (2006.01)

(52) U.S. Cl.
  CPC ............ *G01F 23/284* (2013.01); *G01S 7/412* (2013.01); *G01S 13/88* (2013.01)

(58) Field of Classification Search
  CPC ......... G01F 23/284; G01S 7/412; G01S 13/88
  USPC ....................................................... 342/124
  See application file for complete search history.

(56) References Cited

U.S. PATENT DOCUMENTS

| 5,661,251 A * | 8/1997 | Cummings ........... G01F 23/284 73/304 R |
| 5,689,265 A | 11/1997 | Otto et al. |
| 6,078,280 A * | 6/2000 | Perdue ................... G01F 23/284 324/629 |
| 9,035,823 B2 | 5/2015 | Pichot |
| 2010/0280771 A1 * | 11/2010 | Mukherjee ............ G01F 23/284 702/55 |
| 2014/0085131 A1 | 3/2014 | Widahl et al. |

(Continued)

FOREIGN PATENT DOCUMENTS

| DE | 4241910 A1 | 6/1994 |
| EP | 2687830 A2 | 1/2014 |
| WO | 20150185156 A1 | 12/2015 |

OTHER PUBLICATIONS

Written Opinion of the International Searching Authority from PCT/EP2017/050878, dated Apr. 24, 2017.

(Continued)

*Primary Examiner* — Frank J McGue
(74) *Attorney, Agent, or Firm* — Westman, Champlin & Koehler, P.A.

(57) ABSTRACT

A method of determining a filling level of a product in a tank, comprising generating and transmitting a transmit signal; propagating the transmit signal towards a surface of the product along a signal propagation path comprising a first portion having known signal propagation properties adjacent to the transceiver and a second portion adjacent to the first portion; receiving a reflection signal resulting from reflections at impedance transitions encountered by the transmit signal, including the surface of the product; determining a first measurement relation based on a timing relation between the transmit signal and the reflection signal; determining a second measurement relation based on the first measurement relation and the known signal propagation properties; and determining the filling level based on the second measurement relation.

13 Claims, 5 Drawing Sheets

(56) References Cited

U.S. PATENT DOCUMENTS

2014/0085133 A1* 3/2014 Flasza .................. G01F 23/284
342/124
2015/0379356 A1* 12/2015 Nikolova ................ G01V 3/12
342/90

OTHER PUBLICATIONS

Notification of Transmittal of the International Search Report and the Written Opinion of the International Searching Authority from PCT/EP2017/050878, dated Apr. 24, 2017, 6 pages.

* cited by examiner

RADAR LEVEL GAUGE SYSTEM AND METHOD WITH SIGNAL PROPAGATION PATH MODELING

TECHNICAL FIELD OF THE INVENTION

The present invention relates to a radar level gauge system and to a method of determining a filling level of a product in a tank.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe acting as a waveguide. The probe is generally arranged to extend vertically from the top towards the bottom of the tank.

An electromagnetic transmit signal is generated by a transceiver and propagated towards the surface of the product in the tank, and an electromagnetic reflection signal resulting from reflection of the transmit signal at the surface is propagated back towards to the transceiver.

Based on a relation between the transmit signal and the reflection signal, the distance to the surface of the product can be determined.

The transmit signal is typically not only reflected at the impedance transition constituted by the interface between the tank atmosphere and the surface of the product, but at several other impedance transitions encountered by the transmit signal. These impedance transitions may, for example, result from fixed structures in the tank, such as the feed-through through the tank roof.

Impedance transitions resulting from fixed structures in the tank may make it difficult to accurately determine the filling level when the filling level is close to the fixed structure.

To improve this situation, it has, for example, been proposed to subtract a representation of a reference measurement (for instance taken when the tank is empty) from the representation of a present measurement.

This approach, which is for example described in U.S. Pat. No. 6,078,280 may generally improve the filling level measurement result, but may be sensitive to changes in the environment, such as temperature etc, occurring between the time when the reference measurement was performed and the time of the present measurement.

It would therefore be desirable to provide for improved filling level measurement, in particular a more robust filling level determination.

SUMMARY OF THE INVENTION

In view of the above, a general object of the present invention is to provide for improved filling level determination, in particular more robust filling level determination.

According to a first aspect of the present invention, it is therefore provided a method of determining a filling level of a product in a tank using a radar level gauge system including a transceiver; a signal propagation device coupled to the transceiver; and processing circuitry coupled to the transceiver for determining the filling level, the method comprising the steps of: generating and transmitting an electromagnetic transmit signal by the transceiver; propagating the transmit signal towards a surface of the product along a signal propagation path including the signal propagation device, wherein the signal propagation path comprises a first portion having known signal propagation properties, and a second portion, the first portion being located between the transceiver and the second portion; providing a computational model of the signal propagation path; receiving, by the transceiver, an electromagnetic reflection signal resulting from reflections at impedance transitions along the signal propagation path, including the surface of the product; determining, based on a timing relation between the transmit signal and the reflection signal, a first measurement relation between energy reflected by the impedance transitions along the first and second portions of the signal propagation path and travel time of the reflection signal along the first and second portions of the signal propagation path; determining a second measurement relation between energy reflected by a first sub-set of the impedance transitions along the second portion of the signal propagation path and travel time of the reflection signal along the second portion of the signal propagation path based on the first measurement relation and the known signal propagation properties of the first portion of the signal propagation path, using the computational model of the signal propagation path; and determining the filling level based on the second measurement relation.

It should be noted that the steps of the methods according to various embodiments of the present invention need not necessarily be performed in any particular order.

The "transceiver" may be one functional unit capable of transmitting and receiving electromagnetic signals, or may be a system comprising separate transmitter and receiver units.

The electromagnetic transmit signal may advantageously be a microwave signal. For instance, the transmit signal may be frequency and/or amplitude modulated on a carrier in the microwave frequency range.

The signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

The signal propagation path starts at the transceiver and may, in addition to the signal propagation device, include a coupling arrangement for coupling a transmit signal output of the transceiver to the signal propagation device. In embodiments where the signal propagation device is a radiating antenna, the coupling arrangement may include a waveguide and/or a process seal defining a boundary of the tank. In embodiments where the signal propagation is a transmission line probe, the coupling arrangement may include at least a feed-through through a tank wall, such as the tank ceiling. The coupling arrangement may also, for instance, include a transmission line, such as a coaxial cable, for connecting the transmit signal output of the transceiver with the feed-through.

The present invention is based on the realization that problems related to unwanted reflection signals from impedance transitions along the signal propagation path, which are unrelated to the product in the tank could be avoided if at least the receiver part of the transceiver could be arranged further out along the signal propagation path than those impedance transitions. In other words, it would be desirable to arrange the transceiver closer to the surface of the product. In practice, this is, however, not possible or at least not desirable for many applications.

The present inventor has now further realized that the virtual position of the transceiver along the signal propagation path can be changed based on knowledge about the signal propagation properties of a first portion of the signal propagation path between this virtual position and the actual position of the transceiver.

In other words, a second measurement relation can be determined for a second portion of the signal propagation path below the above-mentioned first portion of the signal propagation path based on a first measurement relation derived from a timing relation between the transmit signal and the reflection signal, and the known signal propagation properties of the first portion of the signal propagation path.

Since radar level gauge systems generally measure a filling level by propagating the transmit signal at least approximately vertically towards the surface of the product in the tank, the terms "above" and "below" are used herein. It should be understood that embodiments of the present invention may also include radar level gauge systems and methods in which electromagnetic signals are not only propagated generally vertically, but at least partly in another direction. For instance, the transceiver could be arranged outside a side wall of the tank, and the propagation device may then be connected to the transceiver by a transmission line or waveguide extending horizontally, for example.

Through embodiments of the invention, a previously determined reference measurement relation is not used for removing the effects of unwanted impedance transitions. Instead, embodiments of the present invention use a computational model of the signal propagation path in combination with known signal propagation properties of the first portion of the signal propagation path.

The temperature dependence of these known signal propagation properties is negligible compared to the temperature dependence of properties, such as frequency and/or pulse width etc, of the transmit signal provided by the transceiver.

This means that embodiments of the present invention are less sensitive to differences in temperature between the time of a filling level measurement and the time when the reference measurement relation was determined. Accordingly, a more robust filling level determination is provided for.

According to various embodiments of the present invention, the computational model may provide the second measurement relation as a function of the first measurement relation and the known signal propagation properties of the first portion of the signal propagation path.

According to embodiments, the computational model may provide an impedance of the second portion of the signal propagation path as a function of the first measurement relation, and the known propagation properties of the first portion.

The present inventor has surprisingly found that a relatively simple computational model for determining the equivalent impedance of a transmission line provides sufficiently good results also for more complex signal propagation paths including signal propagation paths for free radiating radar level gauge systems where the signal propagation device is a free radiating antenna, such as a horn antenna, a rod antenna or a parabolic antenna etc.

The above-mentioned known signal propagation properties may include signal propagation distance, impedance and signal attenuation of the first portion.

According to various embodiments, furthermore, the first portion of the signal propagation path may include at least a first segment and a second segment, the first segment being located between the transceiver and the second segment; and the step of determining the second measurement relation may comprise the steps of: determining a third measurement relation between energy reflected by a second sub-set of the impedance transitions along a third portion of the signal propagation path including the second segment and the second portion and travel time of the reflection signal along the third portion of the signal propagation path based on the first measurement relation and known signal propagation properties of the first segment, using the computational model of the signal propagation path; and determining the second measurement relation based on the third measurement relation and known signal propagation properties of the second segment, using the computational model of the signal propagation path.

According to a second aspect of the present invention, it is provided a radar level gauge system for determining the filling level of a product in a tank, comprising: a transceiver for generating, transmitting and receiving electromagnetic signals; a signal propagation device coupled to the transceiver and arranged to propagate an electromagnetic transmit signal towards a surface of the product and to return an electromagnetic reflection signal resulting from reflection of the electromagnetic transmit signal at the surface back towards the transceiver, wherein the signal propagation device is included in a signal propagation path for the transmit signal and the reflection signal, the signal propagation path comprising a first portion having known signal propagation properties, and a second portion, the first portion being located between the transceiver and the second portion; and processing circuitry coupled to the transceiver, the processing circuitry comprising: measurement relation determining circuitry for: determining, based on a timing relation between the transmit signal and the reflection signal, a first measurement relation between energy reflected by the impedance transitions along the first and second portions of the signal propagation path and travel time of the reflection signal along the first and second portions of the signal propagation path; and determining a second measurement relation between energy reflected by a first sub-set of the impedance transitions along the second portion of the signal propagation path and travel time of the reflection signal along the second portion of the signal propagation path based on the first measurement relation and the known signal propagation properties of the first portion of the signal propagation path, using a computational model of the signal propagation path; and filling level determining circuitry for determining the filling level based on the second measurement relation.

According to embodiments, the radar level gauge system may be of the so-called FMCW-type (Frequency Modulated Continuous Wave-type). In these embodiments, the transceiver may comprise a microwave signal source controllable to generate the transmit signal; a microwave signal source controller coupled to the microwave signal source and configured to control the microwave signal source to generate the transmit signal in the form of a measurement sweep exhibiting a time-varying carrier frequency, the measurement sweep defining a bandwidth; and a mixer coupled to the microwave signal source and to the signal propagation device, and configured to combine the transmit signal and the reflection signal to form an intermediate frequency signal, wherein the measurement signal determining circuitry determines the first measurement signal based on the intermediate frequency signal.

In embodiments, the above-mentioned bandwidth may be at least 0.5 GHz.

It should be noted that frequency of the transmit signal may be modulated continuously (or quasi-continuously) or in steps.

According to various embodiments, furthermore, the radar level gauge system of the present invention may be controllable between an active state in which the microwave signal source is controlled to generate the transmit signal, and an idle state in which no transmit signal is generated.

The radar level gauge system may further comprise an energy store configured to store energy when the radar level gauge system is in the idle state and provide energy to the microwave signal source when the radar level gauge system is in the active state.

The local energy store may, for example, comprise a battery, a capacitor, and/or a super capacitor.

Moreover, the radar level gauge system may further comprise wireless communication circuitry, such as a radio transceiver, for wireless communication with a remote system.

It should be noted that the signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

It should also be noted that the processing circuitry may be provided as one device or several devices working together.

Further effects and variations of the present second aspect of the invention are largely similar to those described above with reference to the first aspect of the invention.

In summary, the present invention thus relates to a method of determining a filling level of a product in a tank, comprising generating and transmitting a transmit signal; propagating the transmit signal towards a surface of the product along a signal propagation path comprising a first portion having known signal propagation properties adjacent to the transceiver and a second portion adjacent to the first portion; receiving a reflection signal resulting from reflections at impedance transitions encountered by the transmit signal, including the surface of the product; determining a first measurement relation based on a timing relation between the transmit signal and the reflection signal; determining a second measurement relation based on the first measurement relation and the known signal propagation properties; and determining the filling level based on the second measurement relation.

BRIEF DESCRIPTION OF THE DRAWINGS

These and other aspects of the present invention will now be described in more detail, with reference to the appended drawings illustrating at least one example embodiment of the invention, wherein:

FIG. 1b is a schematic illustration of the measuring unit comprised in the radar level gauge system in FIG. 1a;

DETAILED DESCRIPTION OF AN EXAMPLE EMBODIMENT OF THE INVENTION

In the present detailed description, an exemplary embodiment of the radar level gauge system and tank arrangement according to the present invention is discussed with reference to a radar level gauge system of the guided wave radar (GWR) type in which electromagnetic signals are propagated along a transmission line probe. Furthermore, in the example radar level gauge system described herein, the frequency of the electromagnetic transmit signal is varied within a measurement sweep, and the electromagnetic reflection signal is mixed with the transmit signal to form a measurement signal in the form of an intermediate frequency (IF) signal. Moreover, one example of a computational model of the signal propagation path for the electromagnetic signals is described.

It should be noted that this by no means limits the scope of the present invention, which is equally applicable to other radar level gauge systems, such as a radar level gauge system of the free-radiating type in which the electromagnetic transmit signal is radiated towards the product in the tank by an antenna, such as a horn antenna, a rod antenna or a parabolic antenna. Furthermore, the radar level gauge system may equally well be a pulsed radar level gauge system, in which a transmit signal in the form of a transmit pulse train is propagated towards the product in the tank, and a received reflection pulse train is correlated with a reference signal in the form of a reference pulse train.

Figure 1A:
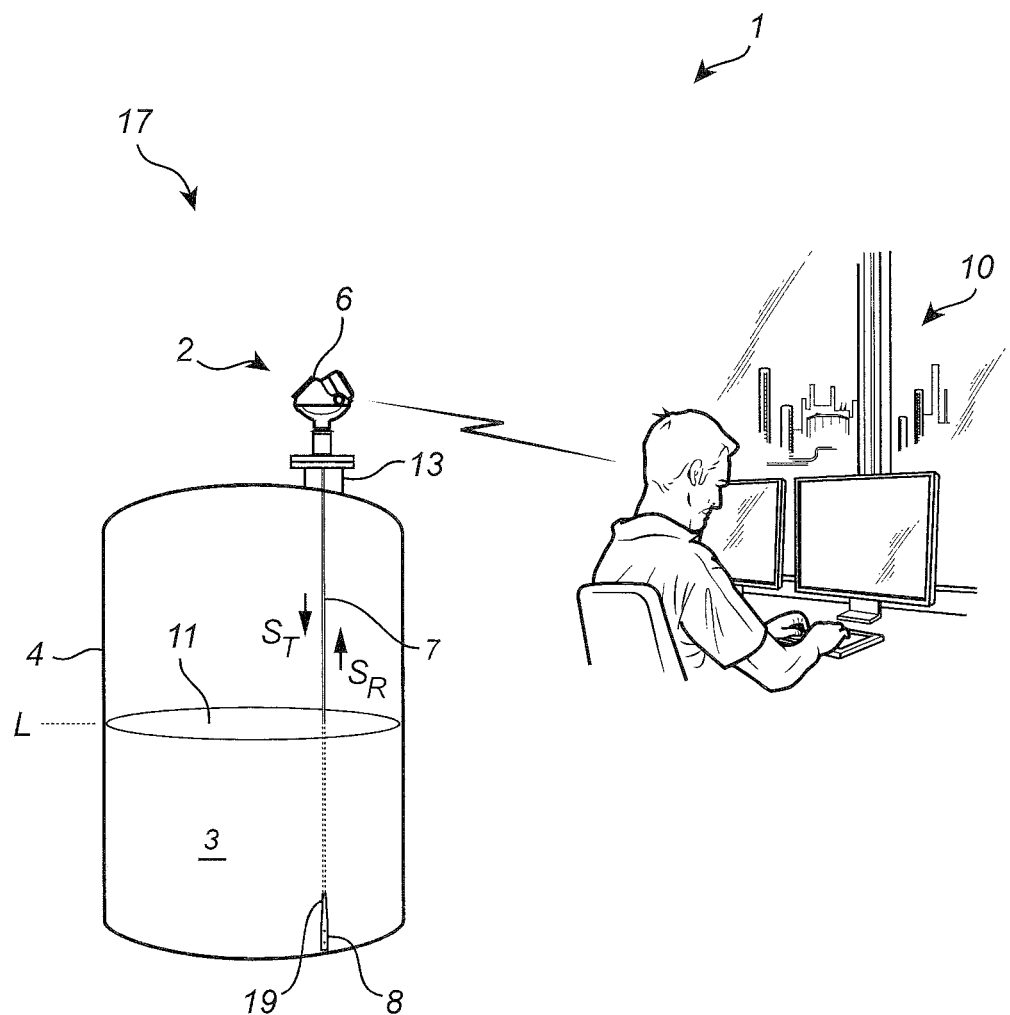
FIG. 1a schematically illustrates an exemplary tank arrangement comprising a radar level gauge system according to an embodiment of the present invention.

FIG. 1a schematically shows a level measuring system 1 comprising a tank arrangement 17 according to an example embodiment of the present invention, and a host system 10 illustrated as a control room.

The tank arrangement 17 comprises a radar level gauge system 2 of GWR (Guided Wave Radar) type and a tank 4 having a tubular mounting structure 13 (often referred to as a "nozzle") extending vertically from the roof of the tank 4.

The radar level gauge system 2 is installed to measure the filling level of a product 3 contained in the tank 4. The radar level gauge system 2 comprises a measuring unit 6 and a signal propagation device in the form of a single conductor probe 7 extending from the measuring unit 6, through the tubular mounting structure 13, towards and into the product 3. In the example embodiment in FIG. 1a, the single conductor probe 7 is a wire probe having a first end connected to the measuring unit 6 and a second end 19 connected to a probe aligning member, in the form of a weight 8, to keep the wire straight and vertical.

By analyzing transmitted signals $S_T$ being guided by the probe 7 towards the surface 11 of the product 3, and reflected signals $S_R$ traveling back from the surface 11, the measuring unit 6 can determine the distance between a reference position (such as a feed-through between the outside of the tank and the inside of the tank) and the surface 11 of the product 3, whereby the filling level L can be deduced. It should be noted that, although a tank 4 containing a single product 3 is discussed herein, the distance to another material interface resulting in an impedance transition along the probe can be measured in a similar manner.

Figure 1B:
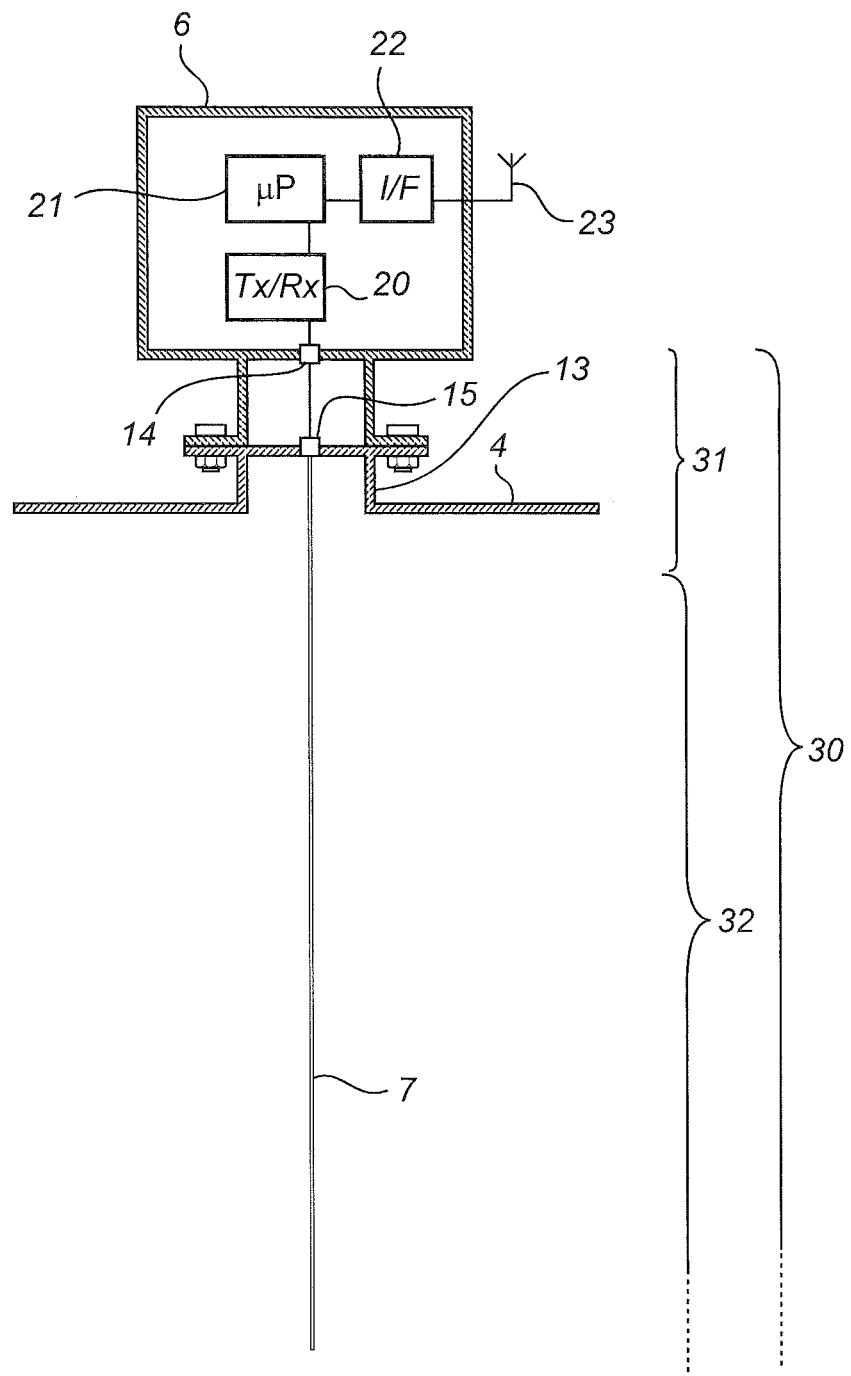

As is schematically illustrated in FIG. 1b, the measuring unit 6 comprises a transceiver 20, processing circuitry 21, a communication interface 22, and a communication antenna 23 for wireless communication with the control room 10.

The transceiver 20 is configured to generate, transmit and receive electromagnetic signals, the processing circuitry 21 is connected to the transceiver 20 and configured to determine the filling level L of the product 3 based on a timing relation between the transmit signal $S_T$ and a received electromagnetic reflection signal $S_R$ being a reflection of the transmit signal $S_T$ at the surface 11 of the product 3, and the communication interface 22 is connected to the processing circuitry 21 and configured to allow communication with the host system 10. In the example embodiment of FIG. 1a, the communication between the radar level gauge system 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

In addition to the above-mentioned surface reflection signal resulting from reflection of the transmit signal at the surface 11 of the product 3 in the tank 4, the transmit signal $S_T$ will be reflected at further impedance transitions encountered along the signal propagation path 30 including the probe 7 and the coupling arrangement between the transceiver 20 and the probe 7. Such further impedance transitions include impedance transitions in a first portion 31 of the signal propagation path 30, and impedance transitions, except the impedance transition at the surface 11 of the product 3, in a second portion 32 of the signal propagation path 30. The first portion 31 is located between the transceiver 20 and the second portion 32.

Depending on the configuration of the measuring unit 6 and the electrical coupling between the transceiver 20 and the signal propagation device, here in the form of transmission line probe 7, inside the tank 4, there may be several impedance transitions along the first portion 31 of the signal propagation path 30. In FIG. 1b, two such possible impedance transitions are schematically indicated by a first small 'box', that may be referred to as 'measuring unit feed-through' 14, and a second small 'box' that may be referred to as 'tank feed-through' 15. Both the measuring unit feed-through 14 and the tank feed-through 15 may result in reflection signals that may be at least partly unwanted. For example the tank feed-through reflection may be used as a so-called fiducial and act as a reference point in the determination of the filling level. However, strong reflection signals from impedance transitions above the level 11 of the surface 11 of the product 3 in the tank 4 may make the filling level determination more difficult, in particular when the filling level is close to the tank feed-through 15.

Depending on the configuration of the tubular mounting structure (nozzle) 13, there may be an additional substantial impedance transition at the lower end of the tubular mounting structure 13.

As was mentioned in the Background section, various techniques are therefore sometimes used to at least partly eliminate the influence on the filling level determination of impedance transitions from fixed structures above the surface of the product.

An embodiment of a new and improved method of achieving this will now be described with reference to the flow-chart in FIG. 2 and the accompanying illustrations in FIG. 3 and FIGS. 4a-b.

Figure 2:
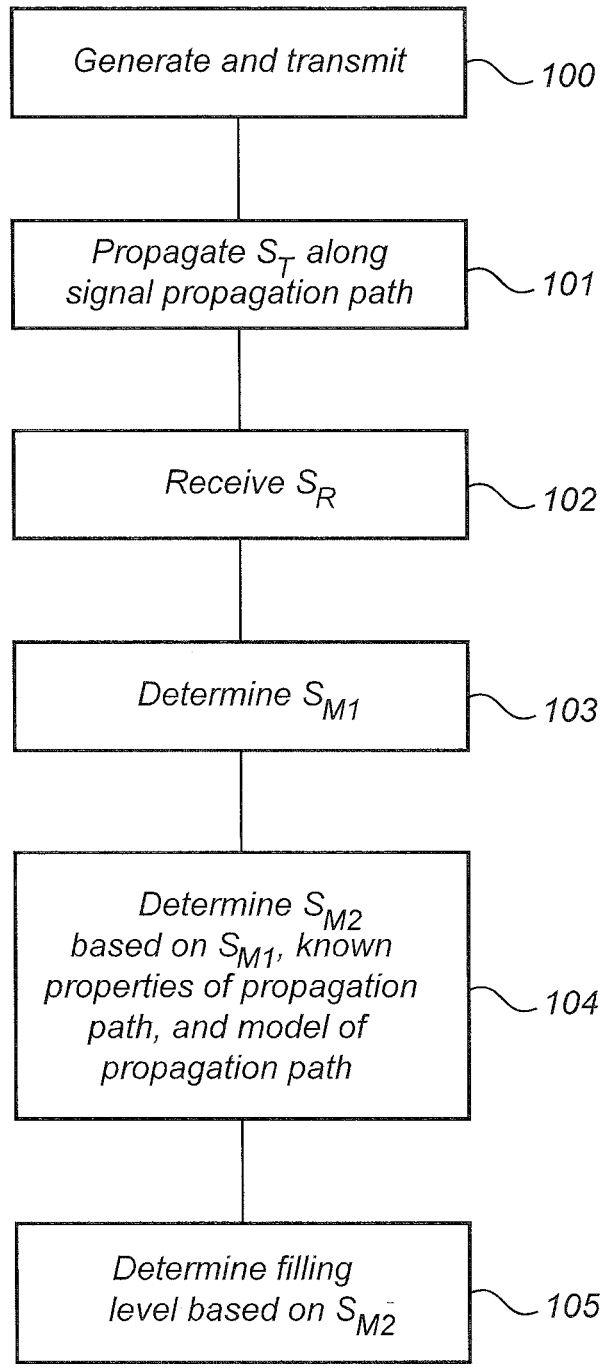
FIG. 2 is a flow chart illustrating a method according to an embodiment of the present invention.

Referring first to the flow-chart in FIG. 2, electromagnetic signals are generated and transmitted, by the transceiver 20, in a first step 100. In the subsequent step 101, the electromagnetic transmit signal $S_T$ is propagated towards the product 3 in the tank 4 along the signal propagation path 30. The transmit signal $S_T$ is reflected at impedance transitions encountered along the signal propagation path 30, and the reflections result in an electromagnetic reflection signal $S_R$ as described further above. The reflection signal $S_R$ is received, by the transceiver 20, in the next step 102.

As is, per se, well known to one of ordinary skill in the art, the distances between the transceiver 20 and the various impedance transitions along the signal propagation path 30 can be determined based on a measurement signal $S_M$ that may be formed by combining the reflection signal $S_R$ and the transmit signal $S_T$ (or a signal with a timing having a known relation to the transmit signal $S_T$). The measurement signal $S_M$ generally indicates reflected energy as a function of travel time of the reflection signal along the signal propagation path 30, that is, from the transceiver 20, to the different impedance transitions along the signal propagation path 30, and back to the transceiver 20. For the case of an FMCW-type radar level gauge system, the measurement signal $S_M$ may indicate the amplitude of the received reflection signal $S_R$ as a function of the frequency of the IF-signal (the difference in carrier frequency between the transmit signal $S_T$ and the reflection signal $S_R$). When the amplitude of the transmit signal $S_T$ is constant, the amplitude of the received reflection signal $S_R$ is equivalent to the reflection coefficient $\rho$.

In step 103, a first measurement relation $S_{M1}$ is determined in this manner. An example of the first measurement relation $S_{M1}$ is provided at the top of FIG. 3, where the reflection coefficient $\rho_0$ as seen from the transceiver 20 is indicated as a function of the frequency of the IF-signal.

Figure 3:
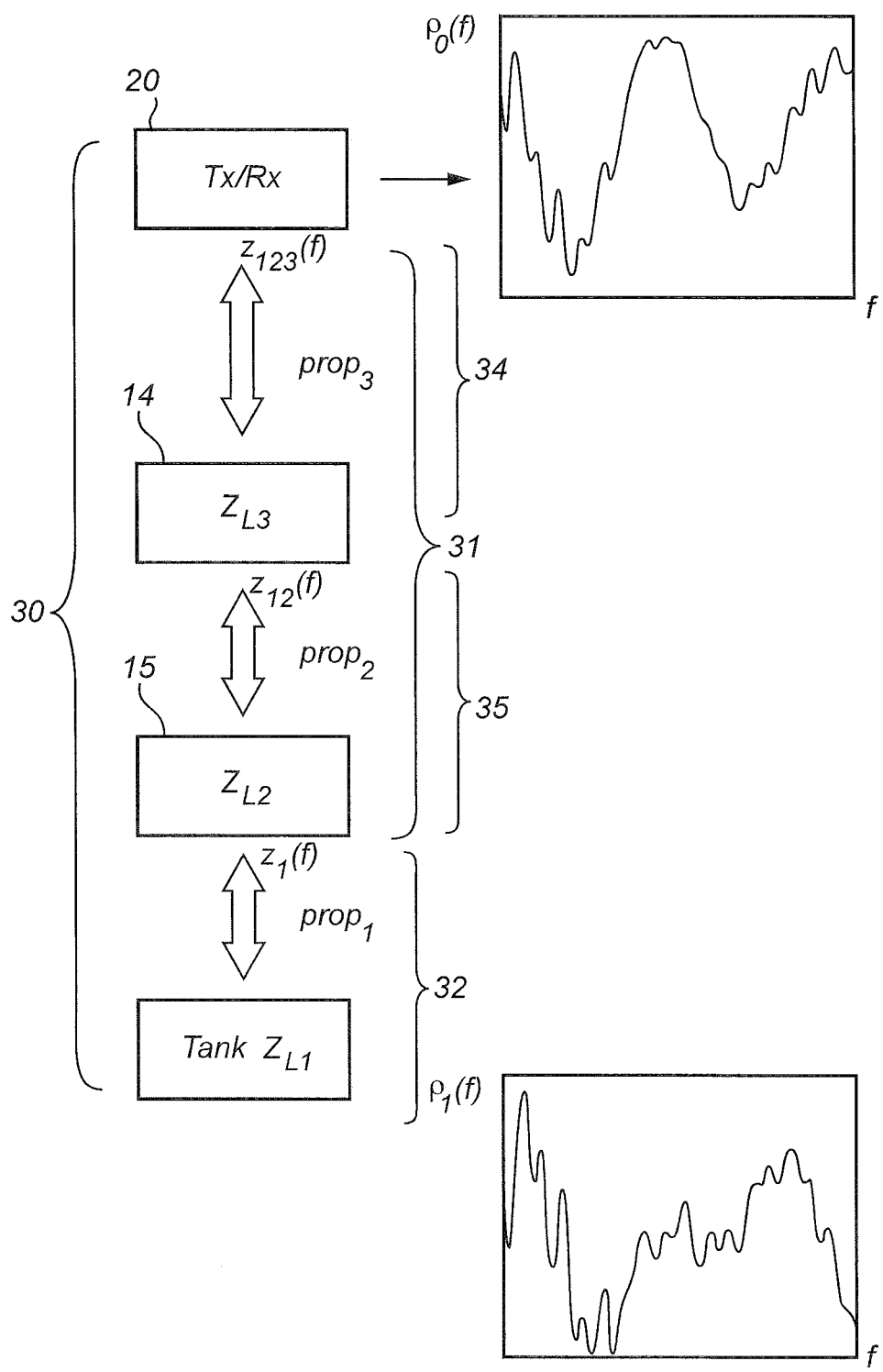
FIG. 3 is a schematic illustration of an example of the modeling of the signal propagation path.
Figure 4A:
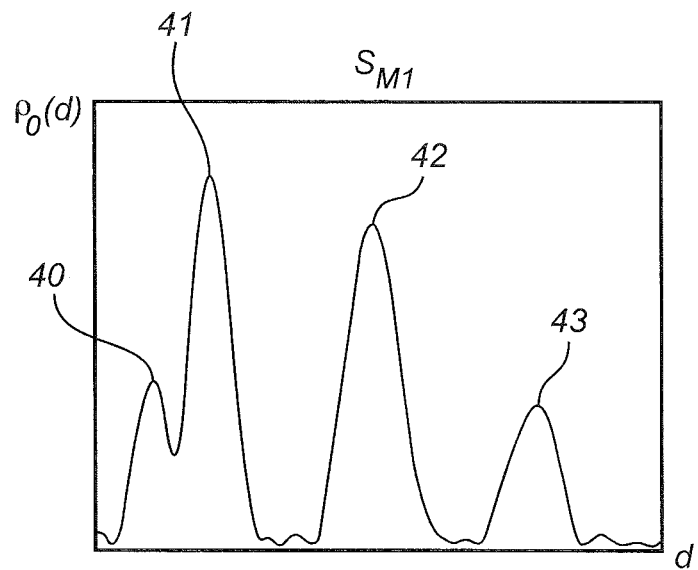
FIG. 4a schematically shows reflection as a function of distance from the transceiver for the exemplary case in FIG. 3 without fiducial elimination.

A conversion of the diagram at the top of FIG. 3 to the time domain (which is equivalent to the distance domain when the propagation velocity of the electromagnetic signals is known), for example using FFT, results in the diagram in FIG. 4a, which indicates reflected energy as a function of distance d from the transceiver 20.

Turning briefly to the diagram in FIG. 4a, the curve contains four distinct peaks indicating the distance from the transceiver 20 to impedance transitions encountered by the transmit signal $S_T$. From left to right in FIG. 4a, the first peak 40 represents reflection at the measuring unit feed-through 14, the second peak 41 represents reflection at the tank feed-through 15, the third peak 42 represents reflection at the surface 11, and the fourth peak represents a double reflection—the transmit signal is reflected at the surface 11, at the tank feed-through 15, and finally at the surface 11 again before being received by the transceiver 20. As is clear from the diagram in FIG. 4a, the reflection at the tank feed-through 15 is similar in magnitude to the reflection at the surface 11, which could make it difficult to distinguish the surface reflection when the surface 11 is close to the tank feed-through 15.

Returning to the flow-chart in FIG. 2, the method proceeds to step 104 and determines a second measurement relation $S_{M2}$ based on the first measurement relation $S_{M1}$, known propagation properties of the first portion 31 of the signal propagation path, and a computational model of the signal propagation path 30.

One suitable computational model of the signal propagation path 30, which does not require heavy calculations and still provides a sufficiently good result, is based on the well known general transmission line equations, which are also sometimes referred to as the telegrapher's equations.

According to this computational model, the impedance seen by the transceiver 20 can be determined by dividing the signal propagation path 30 into impedance steps and determining the equivalent impedance step-by-step from the end of the signal propagation path 30 towards the transceiver 20.

For example, considering only one impedance step along the signal propagation path, the equivalent impedance $Z_{eq}$ seen by the transceiver 20 would be given by:

$$Z_{eq} = Z_0(Z_L + Z_0 \tan h\gamma l)/(Z_L + Z_0 \tan h\gamma l), \quad (\text{Eq 1})$$

where $Z_0$ is the impedance of the signal propagation path between the transceiver 20 and the impedance step, $Z_L$ is the load impedance, $\gamma$ is the attenuation in the signal propagation path between the transceiver 20 and the impedance step, and l is the length of the signal propagation path between the transceiver 20 and the impedance step.

Obviously, the above equation (Eq 1) can be rewritten so that the load impedance can be determined as a function of the other parameters of Eq 1.

By doing this step-by-step, but starting from the transceiver 20, the equivalent impedance as seen from directly below the tank feed-through 15 can be determined. Of course, the equivalent impedance as seen from directly below the tubular mounting structure (nozzle) 13 can also be determined if desired.

This procedure will now be described with reference to FIG. 3, where the signal propagation path 30 is schematically illustrated as a series of input impedances as seen from different positions along the signal propagation path 30. In the presently illustrated example, the above-mentioned first portion 31 of the signal propagation path 30 includes a first segment 34 with the measuring unit feed-through 14, and a second segment 35 with the tank feed-through 15. The second portion 32 of the signal propagation path 30 is here taken to be the remainder of the signal propagation path below the tank feed-through 15.

Starting from the transceiver 20 at the top of the illustration in FIG. 3, the first measurement relation $S_{M1}$, here represented by the reflection coefficient $\rho_0$ as a function of frequency of the IF-signal is determined. This was described above in connection with step 103. As is well-known to one of ordinary skill in the art, the load seen by the transceiver can be expressed in terms of the reflection coefficient $\rho$, or impedance Z.

In the example illustrated in FIG. 3, the load impedance $Z_{123}$ seen by the transceiver 20 can be expressed in terms of the reflection coefficient seen by the transceiver 20 and propagation properties prop$_3$ (particularly the characteristic impedance) of the signal propagation path between the transceiver 20 and the load according to the following relation:

$$Z_{123} = Z_0(1+\rho_0)/(1-\rho_0), \quad (\text{Eq 2})$$

where $Z_0$ is the characteristic impedance of the signal propagation path from the transceiver 20 to the measuring unit feed-through 14, and the reflection coefficient $\rho_0$ is given by the first measurement relation $S_{M1}$. If a coaxial cable is used for connecting the output of the transceiver 20 with the measuring unit feed-through 14, the characteristic impedance $Z_0$ will typically be around 50Ω.

The relation between load impedance $Z_{123}$ and reflection coefficient $\rho_0$ in Eq 2 can thus be illustrated by the following relation:

$$Z_{123} = f(\rho_0, \text{prop}_3), \quad (\text{Eq 3})$$

As explained above, the load impedance $Z_{123}$ seen by the transceiver can also, for example based on Eq 1, be expressed in terms of the impedance $Z_{L3}$ of the measuring unit feed-through 14, the propagation properties prop$_3$ of the portion of the signal propagation path between the transceiver 20 and the measuring unit feed-through 14, and the load impedance $Z_{12}$ seen from just below the measuring unit feed-through 14:

$$Z_{123} = f(Z_{L3}, \text{prop}_3, Z_{12}) \quad (\text{Eq 4})$$

Conversely, the load impedance $Z_{12}$ seen from just below the measuring unit feed-through 14 can be expressed in terms of the load impedance $Z_{123}$ at the transceiver 20, the impedance of the measuring unit feed-through 14, and the propagation properties prop$_3$:

$$Z_{12} = f(Z_{123}, Z_{L3}, \text{prop}_3) \quad (\text{Eq 5})$$

$Z_{12}$ can also be expressed in terms of the load impedance $Z_1$ seen from just below the tank feed-through 15, the impedance $Z_{L2}$ of the measuring unit feed-trough 14 and the propagation properties prop$_2$ of the portion of the signal propagation path between the measuring unit feed-through 14 and the tank feed-through 15:

$$Z_{12} = f(Z_1, Z_{L2}, \text{prop}_2) \quad (\text{Eq 6})$$

In analogy with Eq 5 above, Eq 6 can be solved for $Z_1$:

$$Z_1 = f(Z_{12}, Z_{L2}, \text{prop}_2) \quad (\text{Eq 7})$$

The load impedance $Z_1$ as seen from just below the tank feed-through 15 can be converted to the reflection coefficient $\rho_1$, where prop$_1$ here stands for the probe impedance inside the tank 4:

$$\rho_1 = f(Z_1, \text{prom}) \quad (\text{Eq 8})$$

Combining Eq3, Eq 5, Eq 7, and Eq 8, we find that the reflection as seen from just below the tank feed-through 15 can be determined based on the first measurement relation $S_{M1}$ and the signal propagation properties of the first portion 31 of the signal propagation path 30 according to the following:

$$\rho_1 = f(\rho_0, Z_{L3}, \text{prop}_3, Z_{L2}, \text{prop}_2, \text{prop}_1) \quad (\text{Eq 9})$$

This reflection coefficient $\rho_1$, which is an example of the second measurement relation $S_{M2}$ is shown in the bottom diagram in FIG. 3 as a function of the frequency of the IF-signal.

Figure 4B:
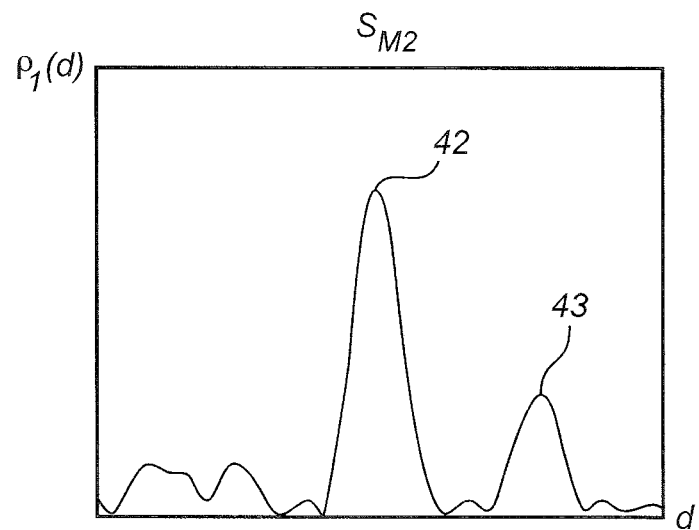
FIG. 4b schematically shows reflection as a function of distance from the transceiver for the exemplary case in FIG. 3 with fiducial elimination using an embodiment of the present invention.

A conversion of the diagram at the bottom of FIG. 3 to the time domain (which is equivalent to the distance domain when the propagation velocity of the electromagnetic signals is known), for example using FFT, results in the diagram in FIG. 4b, which indicates reflected energy as a function of distance d from the transceiver 20.

Comparing the diagram in FIG. 4b with the diagram in FIG. 4a, it is clear that the first 40 and second 41 peaks in FIG. 4a have been practically eliminated, providing for easier and more reliable identification of the peak 42 that represents reflection at the surface 11 of the product 3 in the tank 4.

Returning to the flow-chart in FIG. 2, the filling level is then, in step 105, finally determined based on the second measurement relation $S_{M2}$ in FIG. 4b.

The person skilled in the art realizes that the present invention by no means is limited to the preferred embodi-

What is claimed is:

1. A method of determining a filling level of a product in a tank using a radar level gauge system including a transceiver; a signal propagation device coupled to said transceiver; and processing circuitry coupled to said transceiver for determining said filling level, said method comprising the steps of:

generating and transmitting an electromagnetic transmit signal by said transceiver;

propagating said transmit signal towards a surface of said product along a signal propagation path including said signal propagation device, wherein said signal propagation path comprises a first portion having known signal propagation properties, and a second portion, said first portion being located between said transceiver and said second portion;

providing a computational model of said signal propagation path;

receiving, by said transceiver, an electromagnetic reflection signal resulting from reflections at impedance transitions along said signal propagation path, including said surface of the product;

determining, based on a timing relation between said transmit signal and said reflection signal, a first measurement relation between energy reflected by said impedance transitions along the first and second portions of said signal propagation path and travel time of said reflection signal along the first and second portions of said signal propagation path;

determining a second measurement relation between energy reflected by a first sub-set of said impedance transitions along the second portion of said signal propagation path and travel time of said reflection signal along the second portion of said signal propagation path based on said first measurement relation and said known signal propagation properties of the first portion of said signal propagation path, using the computational model of said signal propagation path; and determining said filling level based on said second measurement relation.

2. The method according to claim 1, wherein said computational model provides said second measurement relation as a function of said first measurement relation and said known signal propagation properties of the first portion of said signal propagation path.

3. The method according to claim 1, wherein:

the first portion of said signal propagation path includes at least a first segment and a second segment, said first segment being located between said transceiver and said second segment; and said step of determining said second measurement relation comprises the steps of:

determining a third measurement relation between energy reflected by a second sub-set of said impedance transitions along a third portion of said signal propagation path including said second segment and said second portion and travel time of said reflection signal along the third portion of said signal propagation path based on said first measurement relation and known signal propagation properties of said first segment, using the computational model of said signal propagation path; and determining said second measurement relation based on said third measurement relation and known signal propagation properties of said second segment, using the computational model of said signal propagation path.

4. The method according to claim 1, wherein said computational model is a transmission line model.

5. The method according to claim 1, wherein said known signal propagation properties of said first portion include signal propagation distance, impedance and signal attenuation of said first portion.

6. A radar level gauge system for determining the filling level of a product in a tank, comprising:

a transceiver for generating, transmitting and receiving electromagnetic signals;

a signal propagation device coupled to said transceiver and arranged to propagate an electromagnetic transmit signal towards a surface of the product and to return an electromagnetic reflection signal resulting from reflection of the electromagnetic transmit signal at the surface back towards said transceiver, wherein said signal propagation device is included in a signal propagation path for said transmit signal and said reflection signal, said signal propagation path comprising a first portion having known signal propagation properties, and a second portion, said first portion being located between said transceiver and said second portion; and processing circuitry coupled to said transceiver, said processing circuitry comprising:

measurement relation determining circuitry for:

determining, based on a timing relation between said transmit signal and said reflection signal, a first measurement relation between energy reflected by said impedance transitions along the first and second portions of said signal propagation path and travel time of said reflection signal along the first and second portions of said signal propagation path; and determining a second measurement relation between energy reflected by a first sub-set of said impedance transitions along the second portion of said signal propagation path and travel time of said reflection signal along the second portion of said signal propagation path based on said first measurement relation and said known signal propagation properties of the first portion of said signal propagation path, using a computational model of said signal propagation path; and filling level determining circuitry for determining said filling level based on said second measurement relation.

7. The radar level gauge system according to claim 6, further comprising a coupling arrangement coupling said signal propagation device to said transceiver, wherein said signal propagation path further includes said coupling arrangement.

8. The radar level gauge system according to claim 7, wherein said first portion of the signal propagation path includes said coupling arrangement.

9. The radar level gauge system according to claim 7, wherein said coupling arrangement comprises a feed-through between an exterior of said tank and an interior of said tank.

10. The radar level gauge system according to claim 6, wherein said transceiver comprises:

a microwave signal source controllable to generate said transmit signal;

a microwave signal source controller coupled to said microwave signal source and configured to control said microwave signal source to generate said transmit signal in the form of a measurement sweep exhibiting a time-varying frequency, said measurement sweep defining a bandwidth; and a mixer coupled to said microwave signal source and to said signal propagation device, and configured to combine said transmit signal and said reflection signal to form an intermediate frequency signal, wherein said measurement signal determining circuitry determines said first measurement signal based on said intermediate frequency signal.

11. The radar level gauge system according to claim 10, wherein said bandwidth is at least 0.5 GHz.

12. The radar level gauge system according to claim 6, wherein said signal propagation device is a transmission line probe extending towards and into said product in the tank.

13. The radar level gauge system according to claim 6, wherein said signal propagation device is a radiating antenna arranged to radiate said transmit signal towards the surface of said product in the tank.

* * * * *

UNITED STATES PATENT AND TRADEMARK OFFICE
CERTIFICATE OF CORRECTION

PATENT NO. : 10,209,118 B2
APPLICATION NO. : 15/002473
DATED : February 19, 2019
INVENTOR(S) : Mikael Eriksson It is certified that error appears in the above-identified patent and that said Letters Patent is hereby corrected as shown below:

In the Specification

Column 10, Line 37, please replace Equation 8 with the following:
$$\rho_1 = f(Z_1, prop_1) \qquad (Eq\ 8)$$

Signed and Sealed this
Ninth Day of July, 2019

Andrei Iancu
*Director of the United States Patent and Trademark Office*